(12) United States Patent
Agarwal et al.

(10) Patent No.: US 11,724,720 B2
(45) Date of Patent: Aug. 15, 2023

(54) UNSUPERVISED VELOCITY PREDICTION AND CORRECTION FOR URBAN DRIVING ENTITIES FROM SEQUENCE OF NOISY POSITION ESTIMATES

(71) Applicant: GM Global Technology Operations LLC, Detroit, MI (US)

(72) Inventors: Amit Agarwal, Noida (IN); Hyukseong Kwon, Thousand Oaks, CA (US); Rajan Bhattacharyya, Sherman Oaks, CA (US); Michael J. Daily, Thousand Oaks, CA (US); Gavin D. Holland, Oak Park, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 17 days.

(21) Appl. No.: 17/487,809

(22) Filed: Sep. 28, 2021

(65) Prior Publication Data
US 2023/0100741 A1    Mar. 30, 2023

(51) Int. Cl.
*B60W 60/00* (2020.01)
*B60W 50/00* (2006.01)

(52) U.S. Cl.
CPC .... *B60W 60/0027* (2020.02); *B60W 50/0098* (2013.01); *B60W 2050/006* (2013.01); *B60W 2554/4042* (2020.02); *B60W 2554/4043* (2020.02); *B60W 2554/4044* (2020.02); *B60W 2556/60* (2020.02); *B60W 2720/10* (2013.01); *B60W 2720/12* (2013.01)

(58) Field of Classification Search
CPC ............. B60W 60/0027; B60W 50/0098
See application file for complete search history.

(56) References Cited

U.S. PATENT DOCUMENTS

| | | | | |
|---|---|---|---|---|
| 6,122,572 | A * | 9/2000 | Yavnai | G05D 1/0088 |
| | | | | 342/16 |
| 10,019,006 | B2 * | 7/2018 | Shah | G05D 1/0206 |
| 2014/0282470 | A1 * | 9/2014 | Buga | G06F 8/65 |
| | | | | 717/170 |
| 2015/0065161 | A1 * | 3/2015 | Ganesh | H04W 4/027 |
| | | | | 455/456.1 |
| 2020/0192373 | A1 * | 6/2020 | Levandowski | B60W 30/12 |
| 2020/0245115 | A1 * | 7/2020 | Dorrance | H04L 41/142 |

OTHER PUBLICATIONS

Bastista, et al., "Optimal position and velocity navigation filters for autonomous vehicles," Automatica, vol. 46, Issue 4, Apr. 2010, pp. 767-774 (Year: 2010).*

NCSS, LLC., Circular Data Analysis, NCSS Statistical Software, Accessed Feb. 4, 2022, pp. 230-1-230-27, Chapter 230.

* cited by examiner

*Primary Examiner* — Joan T Goodbody
(74) *Attorney, Agent, or Firm* — Vivacqua Crane PLLC

(57) ABSTRACT

A method using unsupervised velocity prediction and correction for urban driving from sequences of noisy position estimates includes: performing a vehicle velocity prediction for one or more other vehicles in a vicinity of a host automobile vehicle; calculating a first heuristic based on a uniformity test; calculating a second heuristic based on a vehicle speed of the one or more other vehicles; combining the first heuristic and the second heuristic using a weighted sum; determining an uncertainty mask applying the combined first heuristic and the second heuristic and a heuristic threshold; and applying the uncertainty mask to identify a velocity correction for use by the host automobile vehicle.

6 Claims, 3 Drawing Sheets

UNSUPERVISED VELOCITY PREDICTION AND CORRECTION FOR URBAN DRIVING ENTITIES FROM SEQUENCE OF NOISY POSITION ESTIMATES

INTRODUCTION

The present disclosure relates to systems and methods for predicting and correcting an automobile vehicle velocity.

In domains like autonomous driving, vehicles are non-holonomic systems. Similarly, in autonomous/unmanned flying, drones and unmanned aerial vehicles (UAV)s are non-holonomic systems. The self-operating vehicle detects and localizes other vehicles using machine learning and computer vision techniques that are error-prone and often hard-to-interpret. These vehicle detections are then transformed from a sensor coordinate frame to a self-vehicle coordinate frame and are then transformed into a global GPS coordinate frame to determine a ground location for these vehicles. The final ground location of a vehicle is represented as a Latitude-Longitude-Altitude triplet, or a geo-referenced x, y, z triplet.

Each of these transformations makes the predicted vehicle locations susceptible to error due to reasons including, but not limited to, imperfect sensor calibration, sensor movement during data capture, and imperfect GPS for the self-operating vehicle. A collection of these triplets is passed through a Kalman filter to establish vehicle tracks across time and to reduce error. Naïve methods often calculate heading by computing an angle between the locations of the vehicle at a current time-point and a previous time-point. These naïve methods offer highly erroneous heading estimates.

Thus, while current autonomously operated vehicles generate heading estimates and achieve their intended purpose, there is a need for a new and improved system and method using unsupervised velocity prediction and correction for urban driving from sequences of noisy position estimates.

SUMMARY

According to several aspects, a method using unsupervised velocity prediction and correction for urban driving from sequences of noisy position estimates includes: utilizing heuristics to identify times of potential errors in a vehicle speed and a vehicle heading; and applying domain information to correct the potential errors.

In another aspect of the present disclosure, the method further includes performing a vehicle velocity prediction for one or more other vehicles in a vicinity of a host automobile vehicle.

In another aspect of the present disclosure, the method further includes calculating the heuristics including: calculating a first heuristic based on a uniformity test; and calculating a second heuristic based on the vehicle speed; combining the first heuristic and the second heuristic using a weighted sum; determining an uncertainty mask applying the combined first heuristic and the second heuristic and a heuristic threshold; and applying the uncertainty mask to identify a velocity correction.

In another aspect of the present disclosure, the method further includes replacing values of the vehicle speed and the vehicle heading with 'Not a number' when applying the uncertainty mask.

In another aspect of the present disclosure, the method further includes filling in the vehicle heading by interpolating between closest confident neighbors on each side of the 'Not a number' when identifying the velocity correction.

In another aspect of the present disclosure, the method further includes filling in the vehicle speed with a speed array put through a gaussian filter, except where the vehicle speed is expected to be zero when identifying the velocity correction.

In another aspect of the present disclosure, the method further includes: providing multiple agent tokens for one or more other vehicles in a vicinity of the host automobile vehicle; and individually incorporating a timestamp, a vehicle identification (ID), an "X" location for the one or more other vehicles, a "Y" location for the one or more other vehicles, an optional speed, and an optional heading for the multiple agent tokens.

In another aspect of the present disclosure, the method further includes: passing the tokens for individual ones of other vehicle operating in the vicinity of the host automobile vehicle up to the current time to a velocity prediction and correction module; and operating the velocity prediction and correction module to process all the tokens for one vehicle ID of individual ones of the other vehicles, one vehicle at a time including predicting a velocity of the individual ones of the other vehicles based on the tokens provided.

In another aspect of the present disclosure, the method further includes identifying an instantaneous speed and an instantaneous heading based on the "X" location and the "Y" location and a time.

In another aspect of the present disclosure, the method further includes selecting the host automobile vehicle as an autonomous operated vehicle.

According to several aspects, a method using unsupervised velocity prediction and correction for urban driving from sequences of noisy position estimates includes: performing a vehicle velocity prediction for one or more other vehicles in a vicinity of a host automobile vehicle; calculating a first heuristic based on a uniformity test; calculating a second heuristic based on a vehicle speed of the one or more other vehicles; combining the first heuristic and the second heuristic using a weighted sum; determining an uncertainty mask applying the combined first heuristic and the second heuristic and a heuristic threshold; and applying the uncertainty mask to identify a velocity correction for use by the host automobile vehicle.

In another aspect of the present disclosure, the method further includes: replacing values of the vehicle speed and a vehicle heading of the one or more other vehicles with 'Not a number' when applying the uncertainty mask; and filling in the vehicle heading by interpolating between closest confident neighbors on each side of the 'Not a number' when identifying the velocity correction.

In another aspect of the present disclosure, the method further includes providing multiple agent tokens for the one or more other vehicles in the vicinity of the host automobile vehicle.

In another aspect of the present disclosure, the method further includes passing the agent tokens for each of the one or more other vehicles operating in the vicinity of the host automobile vehicle up to a current time to a velocity prediction and correction module.

In another aspect of the present disclosure, the method further includes operating the velocity prediction and correction module to process all the tokens for a vehicle ID of individual ones of the one or more other vehicles, one vehicle at a time including predicting the velocity of the individual ones of the one or more other vehicles based on the tokens provided.

In another aspect of the present disclosure, the method further includes: individually incorporating a timestamp, a vehicle identification (ID), an "X" location for the one or more other vehicles, a "Y" location for the one or more other vehicles, an optional speed, and an optional heading for the multiple agent tokens; including for each "X" location one of either a global positioning system (GPS) referenced location or a GPS Latitude; and adding for each "Y" location one of either a GPS-referenced "Y" location or a GPS longitude.

In another aspect of the present disclosure, the method further includes: basing the first heuristic on the uniformity test defining one of a circular uniformity or a circular z-test for naive computed heading data over a temporal neighborhood; and basing the second heuristic on the velocity of a detected one of the other vehicles, wherein the lower the velocity, the higher a likelihood of jitter occurring in a heading and the vehicle velocity.

According to several aspects, a system using unsupervised velocity prediction and correction for urban driving from sequences of noisy position estimates includes a vehicle velocity prediction for one or more other vehicles in a vicinity of a host automobile vehicle. A first heuristic is based on a uniformity test. A second heuristic is based on a vehicle speed of the one or more other vehicles. A combination of the first heuristic and the second heuristic is determined using a weighted sum. An uncertainty mask is determined by applying the combined first heuristic and the second heuristic and a heuristic threshold. A velocity correction for use by the host automobile vehicle is identified using the uncertainty mask.

In another aspect of the present disclosure, multiple agent tokens are identified for individual ones of the one or more other vehicles in the vicinity of the host automobile vehicle. The multiple agent tokens individually include a timestamp, a vehicle identification (ID), an "X" location for the one or more other vehicles, a "Y" location for the one or more other vehicles, an optional speed, and an optional heading.

In another aspect of the present disclosure, a planning computer receives data from sources including sensors and maps. The planning computer utilizes the velocity correction to determine a speed and a heading for the one or more other vehicles to generate a motion plan for the host automobile vehicle to follow.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
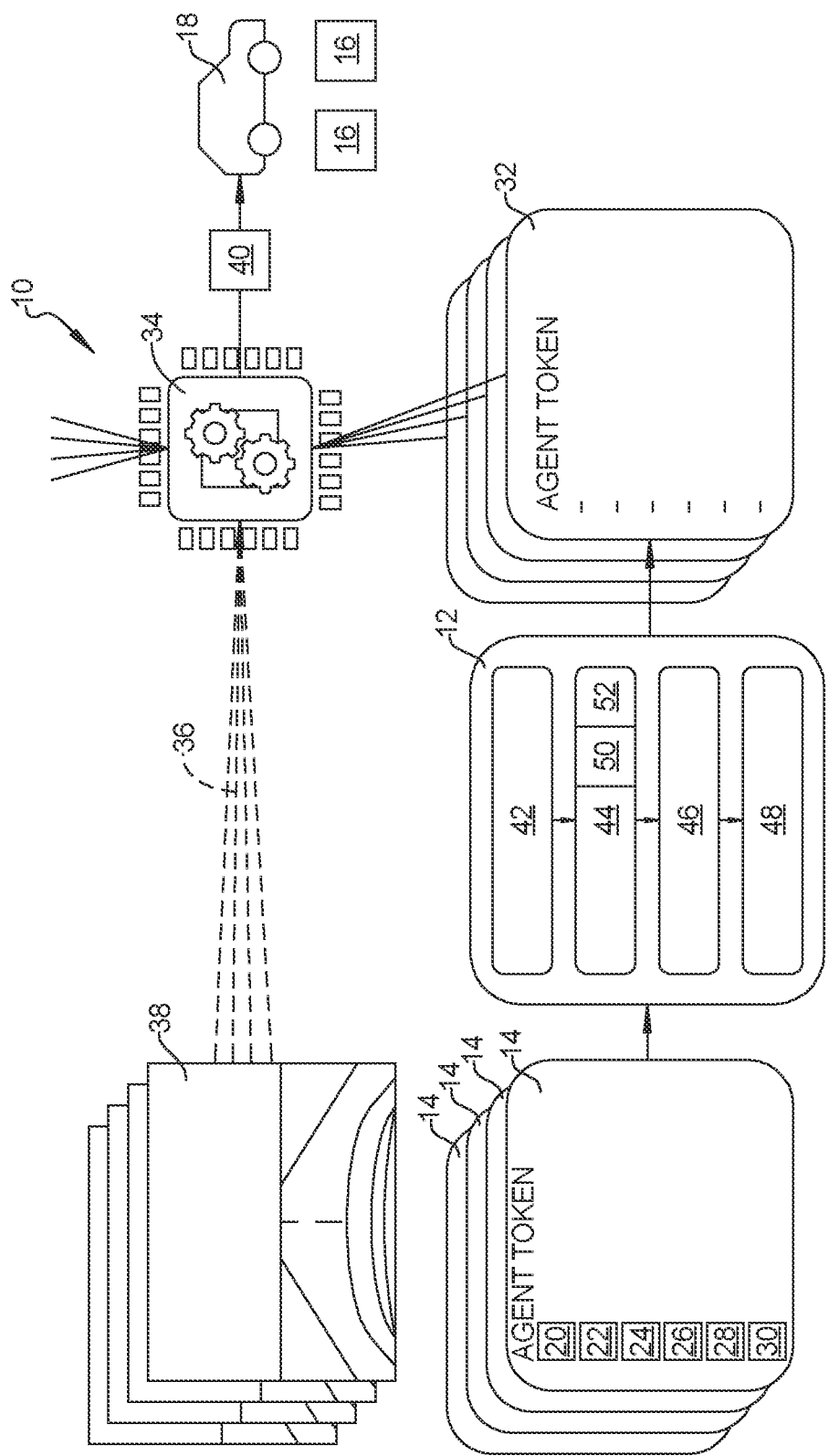
FIG. 1 is a flow diagram of a system and a method using unsupervised velocity prediction and correction for urban driving from sequences of noisy position estimates according to an exemplary aspect.

Referring to FIG. 1, a method using unsupervised velocity prediction and correction for urban driving from sequences of noisy position estimates 10 functions as follows. "Velocity" as used herein is equivalent to a specification of a vehicle speed and a direction of motion. At each time step, perception data from sensors is run through a velocity prediction and correction module 12. The velocity prediction and correction module 12 provides multiple agent tokens 14 for one or more vehicles 16 defining automobile vehicles in the vicinity of a host automobile vehicle 18. According to several aspects the host automobile vehicle 18 defines an autonomous operated vehicle or also defines a self-operating vehicle. Each agent token 14 includes a timestamp 20, a vehicle identification (ID) 22, an "X" location 24, a "Y" location 26, an optional speed 28, and an optional heading 30.

Each timestamp 20 includes the following: a. a timestamp when perception data was recorded; b. either absolute time since Jan. 1, 1970; or c. a time elapsed since the start of data collection; or d. a frame index where each frame is temporally equidistant.

Each vehicle ID 22 includes the following: a. The vehicle ID 22 is obtained from object tracking; and b. the vehicle ID 22 stays consistent across time.

Each "X" location 24 includes the following: a. either a global positioning system (GPS) referenced location; or b. a GPS Latitude.

Each "Y" location 26 includes the following: a. either a GPS-referenced "Y" location; or b. a GPS longitude.

The optional speed 28 includes the following: a. a selected optional speed; or b. an instantaneous velocity naively calculated from the "X" location 24 and the "Y" location 26 of the one or more vehicles 16 in the vicinity of the automobile vehicle 18 from a current and a previous token.

Each heading 30 includes the following: a. an optional heading; or b. an instantaneous heading naively calculated from "X" location 24 and the "Y" location 26 of the one or more vehicles 16 in the vicinity of the automobile vehicle 18 from a current and a previous token.

For each frame, the tokens 14 for each other one of the vehicles 16 operating in the vicinity of the automobile vehicle 18 up to the current time are passed to the velocity prediction and correction module 12. The velocity prediction and correction module 12 processes all the tokens 14 for one vehicle ID 22 of individual ones of the vehicles 16, one vehicle at a time. First, the velocity prediction and correction module 12 predicts a velocity of the individual one of the vehicles 16 based on the tokens 14 provided. Then, a set of heuristics are calculated to assess a likelihood and severity of errors at each time step. Based on the value of these heuristics, at each time step, the velocity and heading of the automobile vehicle 18 are corrected as needed. Then the velocity prediction and correction module 12 yields a set of corrected agent tokens 32 with the velocity and heading fixed according to the heuristics. The velocity prediction and correction module 12 repeats this process for every other vehicle 16 in the vicinity of the automobile vehicle 18. The corrected agent tokens 32 for all other ones of the vehicles 16 in the vicinity of the automobile vehicle 18 are then sent to a planning computer 34. The planning computer 34 includes one or more processors, at least one memory, and instructions stored in the memory. The memory is a non-transitory computer-readable medium.

The planning computer 34 receives additional data 36 from sources like sensors and maps 38. The planning computer 34 utilizes the corrected velocity (speed and heading) for each agent along with information from other sources to generate an appropriate motion plan 40 for the self-operating vehicle 18 to follow. The self-operating vehicle 18 then executes the motion plan 40 using for example a physical accelerator, a brake, and steering controls.

The method for the prediction and correction of vehicle velocity (i.e., heading and speed) from noisy location estimates in an urban driving scenario employs heuristics. A combination of heuristics indicates how error-prone a current heading and speed are. One heuristic used is based on the velocity of a detected one of the other vehicles 16, wherein the lower the velocity, the higher a likelihood of jitter occurring in heading and velocity. Another heuristic used is based on a test of circular uniformity or a circular z-test for naive computed heading data over a temporal neighborhood. These heuristics are used to assess the uncertainty of measurements in the vehicle 16 trajectory at individual timesteps. Based on this assessment, measurements that have a high likelihood of being incorrect are replaced by newly processed measurements. This reprocessing of measurements accounts for error characteristics of heading and speed calculated from a sensor-based vehicle localization and tracking technique.

The velocity prediction and correction module 12 uses a pseudo-code. The pseudocode for one specific aspect of the velocity prediction and correction module 12 is shown below:

```
01: fix_velocity(all_agent_tokens)
02: vehicle_IDs = unique(all_agent_tokens[vehicle_ID])
03:
04: for each vehicle_ID in vehicle_IDs:
05:   agent_tokens = all_agent_tokens[vehicle_ID]
06:   agent_tokens = predict_speed_and_heading(agent_tokens)
07:
08:   # Get mask for times where speed and/or heading is uncertain
09:   agent_uncertain_mask = get_uncertain_mask(agent_tokens)
10:
11:   # Correct uncertain speed and heading values based on mask
12:   correct_uncertainty(agent_tokens, agent_uncertain_mask)
13:
14:
15: predict_speed_and_heading(agent_tokens)
16:   agent_tokens[naive_speed] = calculate_naive_speed(agent_tokens)
17:   agent_tokens[naive_heading] = calculate_naive_heading(agent_tokens)
18:
19:   return agent_tokens
20:
21:
22: get_uncertain_mask(agent_tokens)
23:   # Calculate z-score heuristic for each time stamp
24:   heading_arr = unwrap(agent_tokens[naive_heading])
25:   heading_arr = gaussian_filter(heading_arr)
26:   z_test_score = rayleigh_test(, Z_TEST_WINDOW)
27:
28:   # Calculate speed heuristic for each time stamp
29:   speed_arr = gaussian_filter(agent_tokens[naive_speed])
30:   speed_score = 1 / max(SPEED_THRESHOLD, agent_tokens[naive_speed])
31:
32:   # Combine heuristics for each time stamp
33:   final_score = (SPEED_WEIGHT * speed_score) + (Z_TEST_WEIGHT * z_test_score)
34:   final_score = final_score / (SPEED_WEIGHT + Z_TEST_WEIGHT)
35:
36:   # Threshold heuristics to find particular time stamps of uncertainty
37:   for each time in final_score
38:     if final_score[time] > FINAL_THRESHOLD
39:       uncertain_mask[time] = True
40:     else
41:       uncertain_mask[time] = False
42:
43:   return uncertain_mask
44:
45:
46: correct_uncertainty(agent_tokens, uncertain_mask)
47:   # Prepare heading for correction
48:   heading_arr = unwrap(agent_tokens[naive_heading])
49:   heading_arr = gaussian_filter(heading_arr)
50:
51:   # Replace uncertain heading with 'Not a Number'
52:   heading_arr[uncertain_mask] = NaN
53:
54:   # Fill in 'Not a Number' by interpolating between closest confident neighbors
55:   heading_arr[uncertain_mask] = interpolate(heading_arr, confident_neighbors)
56:
57:   # Wrap heading to fall back to 0-360
58:   heading_arr = wrap(heading_arr)
59:
60:
61:   speed_arr = agent_tokens[naive_speed]
62:
63:   # Replace uncertain heading with 'Not a Number'
64:   speed_arr[uncertain_mask] = NaN
65:
66:   # Fill in 'Not a Number' by using gaussian filtered speed if x and y change
67:   speed_arr[uncertain_mask] = gaussian_filter(speed_arr)
68:
69:   agent_tokens[fixed_heading] = heading_arr
70:   agent_tokens[fixed_speed] = speed_arr
71:
72:   return agent_tokens
```

There are multiple ways the velocity prediction and correction module 12 could be implemented. There are four principal steps performed in the velocity prediction and correction module 12, as follows:

Step 1. Velocity prediction 42
  a. Described in lines 6, 15-19
  b. If provided, discard the vehicle velocity (speed and heading) values from agent tokens 14.
  c. Calculate instantaneous speed and heading based on the "X" location 24 and the "Y" location 26 (or latitude and longitude)

Step 2. Heuristic calculation 44
  a. Described in lines 8-9, 23-34
  b. Calculate heuristic based on Rayleigh's uniformity test
  c. Calculate heuristic based on speed
  d. Combine the heuristics by taking a weighted sum of the two heuristics Step 3. Mask calculation 46
  a. Described in lines 36-43
  b. Calculate an uncertainty mask based on the combined heuristics and a heuristics threshold Step 4. Velocity correction 48
  a. Described in lines 11-12, 46-72
  b. Replace speed and heading values with 'Not a number' based on the uncertainty mask calculated in step 3
  c. Fill in heading by interpolating between the closest confident neighbors on each side of the 'Not a number' d. Fill in speed with the speed array put through a gaussian filter, except where the speed is expected to be zero based on x and y values.

In step 1, the velocity prediction 42 is calculated to identify an instantaneous speed and heading based on the "X" location 24 and the "Y" location 26 and time for the current and previous agent token 14 using Equations 1 and 2 as follows:

$$\text{Speed}_{naive} = \frac{\sqrt{(x_i - x_{i-1})^2 + (y_i - y_{i-1})^2}}{(t_i - t_{i-1})} \quad \text{Equation 1}$$

$$\text{Heading}_{naive} = \tan^{-1}\frac{(x_i - x_{i-1})}{(y_i - y_{i-1})} \quad \text{Equation 2}$$

In step 2, the heuristic calculation 44 is then performed. A first heuristic value 50 is based on a Rayleigh uniformity test. This test is performed on a moving window of heading values. Since this test of uniformity is performed on circular data (heading), a Jammalamadaka et al. implementation of the Rayleigh uniformity test is used. This test provides a value Z between 0 and 1, such that uniform circular distributions provide Z→1, while circular distributions pointing in a single direction provide Z→0. For the velocity prediction and correction module 12, a value closer to 1 signifies uncertainty and sudden changes in the heading, while a value closer to 0 signifies a confident heading direction. In other embodiments, different circular statistics may be used to come up with a similar heuristic that tests for stability and uncertainty in heading direction.

A second heuristic value 52 obtained during the heuristic calculation 44 is based on the speed of the vehicle 16 and is calculated per equation 3 below.

$$h_{speed} = \frac{1}{\max(\text{speed}_{threshold}, \text{speed})} \quad \text{Equation 3}$$

For Equation 3, speed$_{threshold}$ is the minimum speed, based on the uncertainty of the vehicle's sensors, below which the vehicle 16 can be considered stationary. The second heuristic value 50 has a minimum value h→0, which signifies a vehicle moving at a high speed. A maximum value of h→V speed$_{threshold}$, signifies a stationary one of the vehicles 16. It is known that when a vehicle 16 is stationary the heading is often noisy due to naïve calculation of heading and showcases sudden changes. Higher values of the second heuristic value 52 indicate uncertainty and low confidence in the heading and speed reading.

According to several aspects, the above heuristics are combined using a weighted sum. In other aspects, different techniques may be used to combine such heuristics including, but not limited to, multiplication or simple addition. The weighted sum can be calculated as follows using Equation 4, where a and b are the weights for each of the heuristics.

$$h_{final} = \frac{(ah_{speed} + bh_{uniformity})}{(a+b)} \quad \text{Equation 4}$$

In step 3, based on the combined heuristic values, the mask calculation 46 is computed to indicate timestamps where the velocity (speed and heading) values are error-prone or uncertain. The mask calculation 46 is based on the indices or timestamps of the tokens 14 based on the following condition, where h$_{thres}$ is a threshold that decided an uncertainty mask value h$_{final}$ as shown in Equation 5.

$$\text{mask }(h_{final}) = \begin{matrix} \text{False}, & h_{final} < h_{thres} \\ \text{True}, & h_{final} \geq h_{thres} \end{matrix} \quad \text{Equation 5}$$

In step 4, the velocity correction 48 is performed. Based on the uncertainty mask value, the speed and heading values in the agent tokens 14 are replaced with a value of 'NaN' or 'Not a Number'. For heading, these 'NaN's are filled using an interpolation technique. Before using the interpolation technique, the heading values are unwrapped. Unwrapping is commonly used in signal processing with phase angles. Whenever a jump between consecutive phase angles is greater than or equal to π radians, an unwrap shifts the phase angles by adding multiples of ±2π until the jump is less than π radians. In this embodiment, for each contiguous block of 'NaN's, the closest neighbors that are not 'NaN' values before and after the block are obtained. An interpolation between the two closest neighbors is used to fill in the block. Once all 'NaN' values are replaced, the heading values are wrapped again by taking a modulo of the heading angles by 2π. This technique fills in gaps of uncertainty heading based on the heuristics defined above.

For speed, these 'NaN's are filled by placing zeros if the speed is below a predetermined speed$_{threshold}$. Otherwise, the 'NaN's are replaced with a Gaussian filtered version of speed to remove error-prone and unrealistic jumps or oscillations.

Referring to FIG. 2 and again to FIG. 1, a graph 54 compares a heading 56 versus a time 58 in seconds and further against a vehicle speed 60 meters per second. A naively calculated speed 62 is defined between successive data points 64, 64'. A naively calculated heading 65 is also presented.

Figure 2:
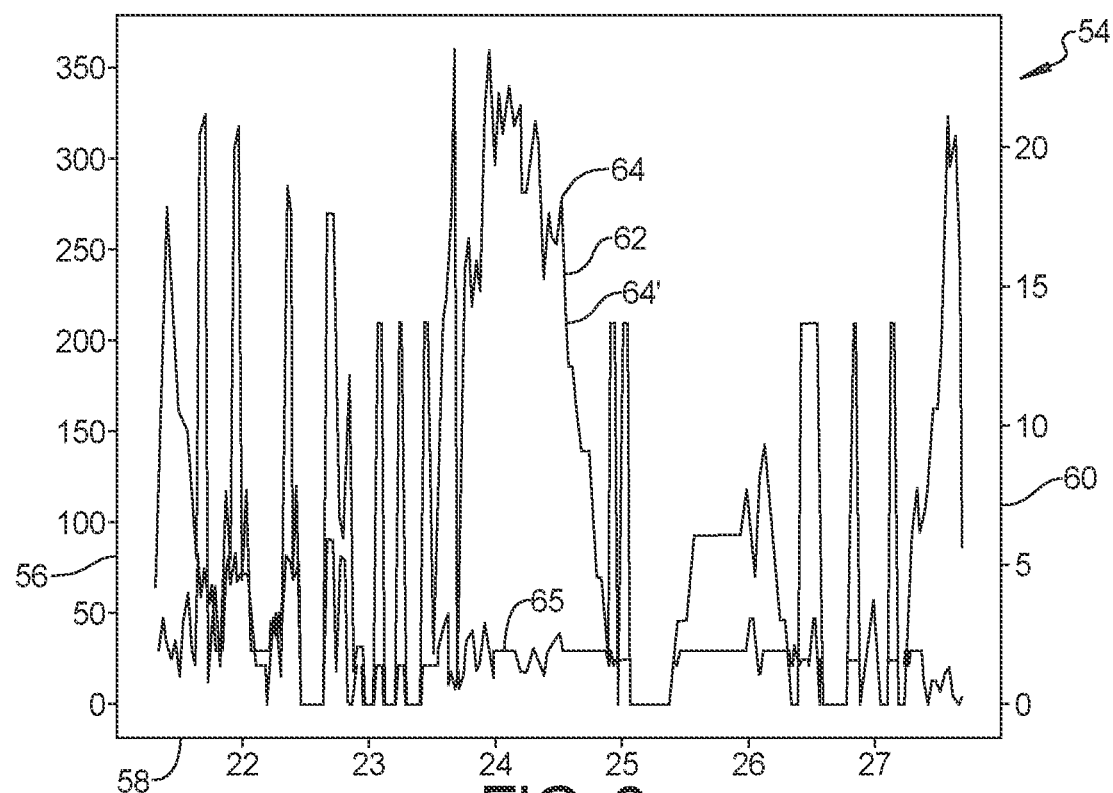
FIG. 2 is a graph presenting raw data available after a first method step to generate a velocity prediction.

Referring to FIG. 3 and again to FIG. 2, a graph 66 compares a heading 68 versus a time 70 in seconds and further against a vehicle speed 72 in meters per second, which are similar to FIG. 2. A heuristic speed 74 is presented along with a heuristic heading 75. Both the heuristic speed 74 and the heuristic heading 75 contribute to generate a combined heuristic 76 to identify times of uncertainty and error.

Figure 3:
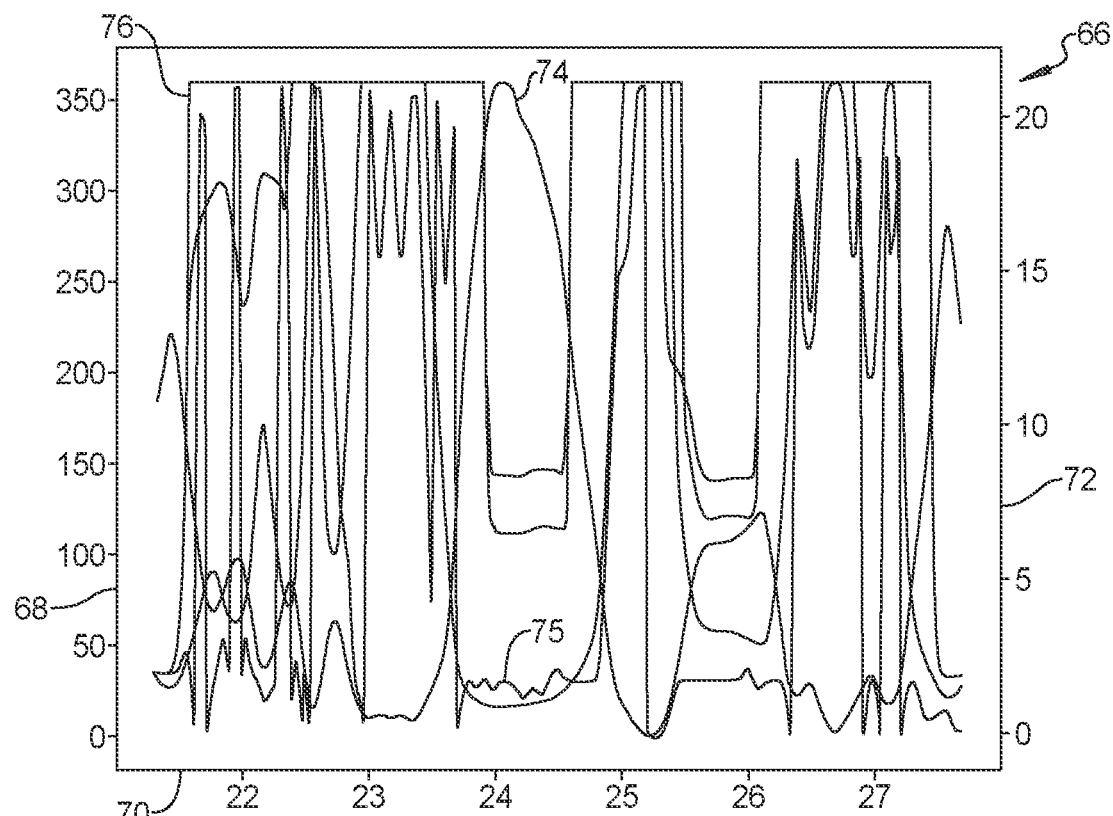
FIG. 3 is a graph presenting data from FIG. 2 after a second method step of generating and combining heuristics.

Referring to FIG. 4 and again to FIGS. 2 through 4, a graph 78 compares a heading 80 versus a time 82 in seconds and further against a vehicle speed 84 in meters per second, which are similar to FIGS. 2 and 3. An uncertainty mask 86 is derived from the combined heuristic 76 discussed in reference to FIG. 3 and is presented as vertical bars of varying thickness or width. The combined heuristic 76 is applied to identify times of uncertainty and error.

Figure 4:
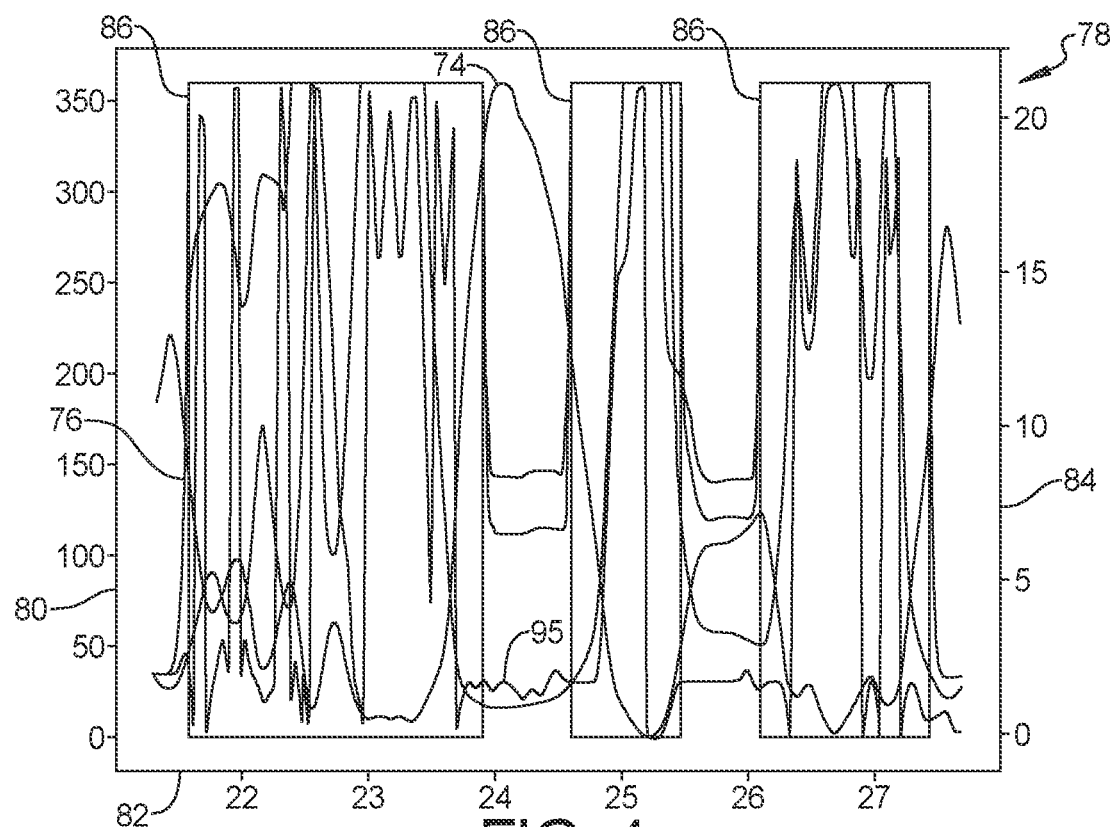
FIG. 4 is a graph further modifying the data of FIG. 3 with the addition of an uncertainty mask.
Figure 5:
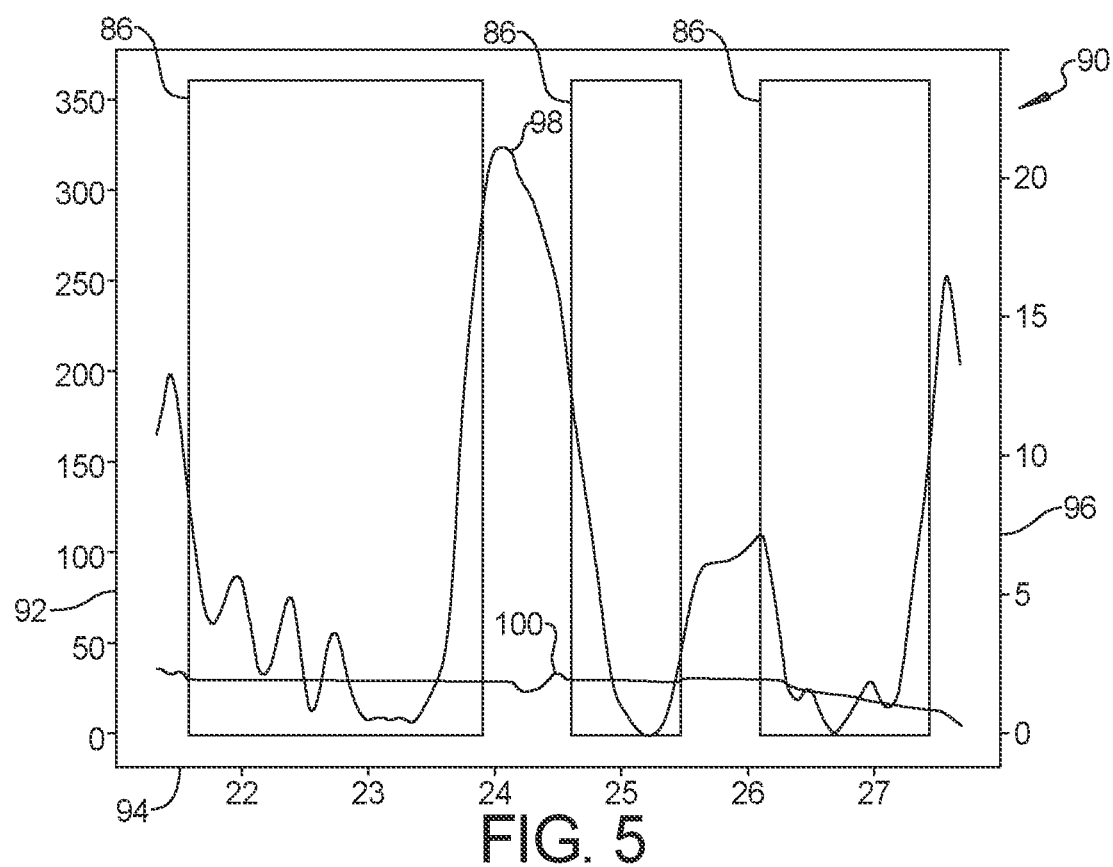
FIG. 5 is a graph further modifying the data of FIG. 4 showing corrected velocity and correcting heading data applying the method of FIG. 1.

Referring to FIG. 5 and again to FIGS. 2 through 4, a graph 90 compares a heading 92 versus a time 94 in seconds and further against a vehicle speed 96 in meters per second, which are similar to FIGS. 2 through 4. The uncertainty mask 86 discussed in reference to FIG. 4 is overlayed. A corrected speed 98 and a corrected heading 100 are generated by the velocity prediction and correction module 12 to correct errors in speed and heading using only the several heuristics noted herein.

A method using unsupervised velocity prediction and correction for urban driving from sequences of noisy position estimates 10 of the present disclosure recognizes and leverages the dependence between vehicle speed and erroneous heading prediction. Specifically, when a vehicle is moving at high-speed naïve methods of heading calculation lead to almost perfect heading estimates. On the other hand, when a vehicle is stationary or is moving at very low speed, the heading calculation is error prone. Minimal deviations in the predicted location of a stationery/very slow-moving vehicle lead to massive deviations in a predicted heading. The system and method of the present disclosure is aware of this dependence and is built to compensate for imperfect location prediction.

A system and method using unsupervised velocity prediction and correction for urban driving from sequences of noisy position estimates 10 of the present disclosure offers several advantages. These include the following. 1. Unsupervised: A machine-learning-based method is not employed, therefore a large amount of collected data with the corresponding ground truth labels is not required. 2. Low computation cost: The present method has a low computational cost, making it easier to integrate into performance-critical resource-limited systems. 3. Sensor-agnostic: The present method does not depend on a particular sensor or sensor modality and is equally applicable to position estimates derived using sensors including, but not limited to, camera (electro-optical), lidar, radar, ultrasonic, infrared, inertial measurement unit (IMU), GPS, or any combination of these sensors. 4. Motion-aware: The present method provides awareness of the general non-holonomic constraints on the motion of an urban vehicle. The heuristics used are designed with these constraints in mind.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for controlling a host vehicle comprising:
   detecting a remote vehicle within perception data received from a sensor mounted to the host vehicle;
   generating agent tokens from the perception data, wherein the agent tokens are associated with the remote vehicle at different times, and the agent tokens each include a time stamp, a remote vehicle identification, and a location of the remote vehicle;
   predicting a velocity of the remote vehicle based on the agent tokens;
   calculating heuristics for each of the agent tokens;
   calculating a weighted sum of the heuristics;
   comparing the weighted sum of the heuristics to a threshold to identity time stamps of the agent tokens where the velocity may have an error;
   correcting the velocity of the agent tokens that have been identified as potentially having an error;
   generating corrected agent tokens having the corrected velocity;
   generating a motion plan based on the corrected agent tokens; and
   controlling the host vehicle using steering, acceleration, and braking based on the motion plan.

2. The method of claim 1, wherein calculating the heuristics includes:
   calculating a first heuristic value based on a uniformity test;
   calculating a second heuristic value based on a vehicle speed of the remote vehicle; and
   combining the first heuristic and the second heuristic using a weighted sum.

3. The method of claim 1, wherein correcting the velocity includes correcting a vehicle heading by interpolating between vehicle headings of closest confident neighbor agent tokens on each side of the agent token that has been identified as having a potential error.

4. The method of claim 1, further including:
   providing multiple agent tokens for one or more other vehicles in a vicinity of the host vehicle; and
   individually incorporating a timestamp, a vehicle identification (ID), an "X" location for the one or more other vehicles, a "Y" location for the one or more other vehicles, a speed, and a heading for the multiple agent tokens.

5. A system for controlling a host vehicle, the system comprising:
   a sensor mounted to the host vehicle;
   a memory;
   a processor in communication with the memory, wherein the processor executes instructions stored in the memory, which cause the processor to execute a method, the method comprising:
      detecting a remote vehicle within perception data received from the sensor;
      generating agent tokens from the perception data, wherein the agent tokens are associated with the remote vehicle at different times, and the agent tokens each include a time stamp, a remote vehicle identification, and a location of the remote vehicle;
      predicting a velocity of the remote vehicle based on the agent tokens;
      calculating heuristics for each of the agent tokens;
      calculating a weighted sum of the heuristics;
      comparing the weighted sum of the heuristics to a threshold to identity time stamps of the agent tokens where the velocity may have an error;
      correcting the velocity of the agent tokens that have been identified as potentially having an error;
      generating corrected agent tokens having the corrected velocity;
      generating a motion plan based on the corrected agent tokens; and
      controlling the host vehicle using steering, acceleration, and braking based on the motion plan.

6. A non-transitory computer readable medium having stored thereon instructions, which when executed by a processor cause the processor to execute a method, the method comprising:
   detecting a remote vehicle within perception data received from a sensor mounted on a host vehicle;
   generating agent tokens from the perception data, wherein the agent tokens are associated with the remote vehicle at different times, and the agent tokens each include a time stamp, a remote vehicle identification, and a location of the remote vehicle;
   predicting a velocity of the remote vehicle based on the agent tokens;
   calculating heuristics for each of the agent tokens;
   calculating a weighted sum of the heuristics;
   comparing the weighted sum of the heuristics to a threshold to identity time stamps of the agent tokens where the velocity may have an error;
   correcting the velocity of the agent tokens that have been identified as potentially having an error;
   generating corrected agent tokens having the corrected velocity;
   generating a motion plan based on the corrected agent tokens; and controlling the host vehicle using steering, acceleration, and braking based on the motion plan.

\* \* \* \* \*